(12) United States Patent
Seok et al.

(10) Patent No.: US 8,175,047 B2
(45) Date of Patent: May 8, 2012

(54) DATA TRANSMISSION METHOD IN WIRELESS MESH NETWORK AND A-MSDU FORMAT

(75) Inventors: Yong Ho Seok, Anyang-si (KR); Alexander A. Safonov, Anyang-si (KR)

(73) Assignee: LG Electronics Inc., Seoul (KR)

( * ) Notice: Subject to any disclaimer, the term of this patent is extended or adjusted under 35 U.S.C. 154(b) by 603 days.

(21) Appl. No.: 12/266,491

(22) Filed: Nov. 6, 2008

(65) Prior Publication Data

US 2009/0122755 A1    May 14, 2009

(30) Foreign Application Priority Data

Nov. 8, 2007    (KR) .................. 10-2007-0113534

(51) Int. Cl.
*H04W 4/00* (2009.01)
*H04L 12/28* (2006.01)
*H04L 12/56* (2006.01)

(52) U.S. Cl. ................. 370/329; 370/389; 370/392
(58) Field of Classification Search .................. None
See application file for complete search history.

(56) References Cited

U.S. PATENT DOCUMENTS

| 2004/0218630 | A1 | 11/2004 | An | |
|---|---|---|---|---|
| 2006/0013256 | A1 | 1/2006 | Lee et al. | |
| 2007/0053354 | A1* | 3/2007 | Rudolf et al. | 370/389 |
| 2007/0140279 | A1* | 6/2007 | Yang et al. | 370/406 |
| 2007/0248104 | A1* | 10/2007 | Rudolf et al. | 370/400 |
| 2007/0291829 | A1* | 12/2007 | Nabetani et al. | 375/219 |

FOREIGN PATENT DOCUMENTS

| KR | 1020040094565 | 11/2004 |
|---|---|---|
| KR | 1020070052772 | 5/2007 |
| WO | 2006031445 | 3/2006 |

OTHER PUBLICATIONS

Duvvuri et al., IEEE P802.11 Wireless LANS: Unified Mesh Management Frame format, Jul. 2007, pp. 1-6.*
Kim, et al., "On Packet Aggregation Mechanisms for Improving VoIP Quality in Mesh Networks", Vehicular Technology Conference, 2006. VTC 2006-Spring. IEEE 63rd. May 2006, pp. 891-895.
Riggio, et al., "Performance of a Novel Adaptive Traffic Aggregation Scheme for Wireless Mesh Networks", Military Communications Conference, 2007. MILCOM 2007. IEEE. Oct. 2007, pp. 1-7.

* cited by examiner

*Primary Examiner* — Chirag Shah
*Assistant Examiner* — Srinivasa Reddivalam
(74) *Attorney, Agent, or Firm* — Lee, Hong, Degerman, Kang & Waimey

(57) ABSTRACT

Provided are a method for transmitting data in wireless mesh networks and A-MSDU format for the method. In the method, in case the receiving MPs of all of the plural MSDUs to be transmitted are identical, a transmitting MP generates an A-MSDU using the plural MSDUs and transmits the A-MSDU to the receiving MP. The A-MSDU includes a plurality of A-MSDU sub-frames each of which includes a sub-frame header unit, an MSDU unit for containing data of each of the plural MSDU, and a padding unit for making each A-MSDU sub-frame a multiple of 4 octets in length. The sub-frame header unit comprises a mesh DA field for specifying an MAC address of the destination MP of the data contained in the MSDU unit, a mesh SA field for specifying an MAC address of the source MP of the data contained in the MSDU unit, and a mesh header field for containing information of the mesh header of each of the plural MSDUs.

8 Claims, 9 Drawing Sheets

FIG. 4

| Order | Information | Notes |
|---|---|---|
| 1 | Category | Notes |
| 2 | Action Value | |
| 3 | Capability | |
| 4 | Supported rates | |
| 5 | Extended Supported Rates | The Extended Supported Rates element is present whenever there are more than eight supported rates, and it is optional otherwise. |
| 6 | Power Capability | The Power Capability element shall be present if dot11SpectrumManagementRequired is true. |
| 7 | Supported Channels | The Supported Channels element shall be present if dot11SpectrumManagementRequired is true. |
| 8 | RSN | The RSN information element is only present within Peer Link Open frames generated by MPs that have dot11RSNAEnabled set to TRUE. |
| 9 | QoS Capability | The QoS Capability element is present when dot11QoS-OptionImplemented is true. |

FIG. 5

| Order | Information | Notes |
|---|---|---|
| 10 | Mesh ID | The Mesh ID information element is present when dot11MeshEnabled is true. |
| 11 | Mesh Configuration | The Mesh Configuration information element is present when dot11MeshEnabled is true. |
| 12 | Peer Link Management | The Peer Link Management information element is present only when dot11MeshEnabled is true. The subtype of the Peer Link Management Element is set to 0. |
| 13 | MSCIE | The MSCIE element is present when dot11MeshEnabled is true. |
| 14 | MSAIE | The MSAIE element is present when dot11MeshEnabled is true. |
| 15 | MIC | This field is present when dot11MeshEnabled is true and the abbreviated handshake is enabled |
| 16 | HT Capabilities | (Mandatory) The HT Capabilities element is present when dot11HighThroughputOptionImplemented attribute is true |
| 17 | Extended Capabilities | (Optional) The Extended Capabilities element shall be present if the dot112040BSSCoexistenceManagementSupport attribute is true and may not be present otherwise. |
| 18 | 20/40 BSS Coexistence | (Optional) The 20/40 BSS Coexistence element may appear in this frame. |
| Last | Vendor Specific | One or more vendor-specific information elements may appear in this frame. This information element follows all other information elements. |

FIG. 6

| Order | Information | Notes |
|---|---|---|
| 1 | Category | |
| 2 | Action Value | |
| 3 | Capability | |
| 4 | Status code | |
| 5 | AID | |
| 6 | Supported rates | |
| 7 | Extended Supported Rates | The Extended Supported Rates element is present whenever there are more than eight supported rates, and it is optional otherwise. |
| 8 | RSN | The RSN information element is only present when dot11RSNAEnabled is set to TRUE. |
| 9 | EDCA Parameter Set | |
| 10 | Mesh ID | The Mesh ID information element is present when dot11MeshEnabled is true. |
| 11 | Mesh Configuration | The Mesh Configuration information element is present when dot11MeshEnabled is true. |

FIG. 7

| Order | Information | Notes |
|---|---|---|
| 12 | Peer Link Management | The Peer Link Management information element is present only when dot11MeshEnabled is true. The subtype of the Peer Link Management Element is set to 1. |
| 13 | MSCIE | The MSCIE element is present when dot11MeshEnabled is true. |
| 14 | MSAIE | The MSAIE element is present when dot11MeshEnabled is true. |
| 15 | MIC | This field is present when dot11MeshEnabled is true and the abbreviated handshake is enabled |
| 16 | HT Capabilities | (Mandatory) The HT Capabilities element is present when dot11HighThroughputOptionImplemented attribute is true |
| 17 | HT Information | (Mandatory) The HT Information element is included by an AP when dot11HighThroughputOptionImplemented attribute is true |
| 18 | Extended Capabilities | (Optional) The Extended Capabilities element shall be present if the dot112040BSSCoexistenceManagementSupport attribute is true and may be present otherwise. |
| 19 | 20/40 BSS Coexistence | (Optional) The 20/40 BSS Coexistence element may appear in this frame. |
| 20 | Overlapping BSS Scan Parameters | (Optional) The Overlapping BSS Scan Parameters element may be present only if the dot11FortyMHzOptionImplemented attribute is true. |
| Last | Vendor Specific | One or more vendor-specific information elements may appear in this frame. This information element follows all other information elements. |

DATA TRANSMISSION METHOD IN WIRELESS MESH NETWORK AND A-MSDU FORMAT

CROSS-REFERENCE TO RELATED PATENT APPLICATIONS

This application claims the benefit of Korean Patent Application No. 10-2007-0113534 filed on Nov. 8, 2007 in the Korean Intellectual Property Office, the disclosure of which is incorporated herein in its entirety by reference.

BACKGROUND

1. Field of the Invention

The present invention relates to a wireless local access network (WLAN), and more particularly, to a data transmission method in a wireless mesh network and a format of an aggregate-medium access control service data unit (A-MSDU) used in the data transmission method.

2. Description of the Related Art

With the recent development of information communication technology, a variety of wireless communication technology has been developed. A WLAN is the technology permitting wireless access to Internet in home or companies or specific service areas by the use of portable terminals such as a personal digital assistant (PDA), a laptop computer, and a portable multimedia player (PMP) on the basis of a radio frequency technology.

The IEEE (Institute of Electrical and Electronics Engineers) 802 which is a standardization of the WLAN technology established in February, 1980 has carried out much standardization work. In the initial WLAN technology, a data rate of 1 to 2 Mbps was supported by the use of frequency hopping, spread spectrum, and infrared communication using a frequency of 2.4 GHz in accordance with the IEEE 802.11. In recent years, 54 Mbps in maximum can be supported by the use of the orthogonal frequency division multiplex (OFDM) technology to the WLAN. In addition, the IEEE 802.11 has developed or is developing a variety of technical standards for improvement in quality of service (QoS), compatibility of an access point (AP) protocol, security enhancement, wireless resource measurement, wireless access in vehicular environment, fast roaming, wireless mesh network, inter-working with external networks, wireless network management, and the like.

The "wireless mesh network" can support direct communication between plural wireless stations having a relay function. In view of functionality, a distribution system (DS) for plural APs can be replaced with an inter-operable wireless link or a multi-hop path between the plural wireless stations. In the mesh network, one wireless station can set up a peer-to-peer wireless link with one or more neighboring wireless stations, thereby constructing a more flexible network.

In the wireless mesh network, one wireless station can establish plural peer links with each of other wireless stations. Thus, plural communication paths can exist between two wireless stations. Among them, the direct communication paths between two wireless stations are called a wireless mesh link or a mesh peer link or a peer link. The wireless stations are called mesh points (MP), which is only an example. A wireless station performing the function of an AP is called mesh access point (MAP).

Such a wireless mesh network has advantages such as flexibility in constructing a network, reliability due to bypass paths, reduction in power consumption due to a decrease in communication distance. More specifically, it is possible to construct a flexible network by using the mesh network even in places not including any wired communication network. In the mesh network, the plural MPs can be connected to each other to guarantee plural bypass paths. Accordingly, even when one MP is out of order, data can be transmitted through another path. In the mesh network, since the communication can be made through a neighboring MP, it is possible for terminals to communicate with low power.

On the other hand, the IEEE 802.11n defines a frame aggregation. The frame aggregation is a protocol for aggregating plural frames (for example, data frames or management action frames) and then transmitting the aggregated frames at one time, or transmitting the aggregated frames in several fragments. In the frame aggregation, an aggregate-MAC service data unit (A-MSDU) is a new format of data acquired by aggregating plural MSDUs. One A-MSDU may be inserted into one MAC protocol data unit (MPDU) and may be then transmitted, or may be divided and inserted into plural MPDUs and may be then transmitted. The plural MSDUs constituting one A-MSDU have the same traffic identifier (TID).

FIG. 1 is a diagram illustrating a format of an A-MSDU described in the IEEE 802.11n standard.

Referring to FIG. 1, the A-MSDU includes plural A-MSDU sub-frames. That is, the basic unit of the A-MSDU is an A-MSDU sub-frame. Each A-MSDU sub-frame includes a sub-frame head field, a MSDU field, and a padding field. The padding field exists in all the A-MSDU sub-frames except for the final A-MSDU sub-frame and is an additional field allowing the length of the A-MSDU sub-frame to be a multiple of 4 octets.

The sub-frame header field includes three subfields. That is, the sub-frame header field includes a destination address subfield (DA), a source address subfield (SA), and a length subfield. The destination address subfield (DA) may be set to the MAC address of a wireless station as the final destination of the A-MSDU sub-frame. The source address subfield (SA) may be set to the MAC address of a wireless station first having initiated the transmission of the A-MSDU sub-frame. The length subfield may be set to a value indicating the length of the MSDU field in the unit of octet.

SUMMARY OF THE INVENTION

In order to allow the MPs (hereinafter, referred to as "HT MP") supporting the IEEE 802.11n in a wireless mesh network to utilize the high throughput (HT) PHY/MAC characteristics such as the frame aggregation, a mesh peer link should be first set up between the MPs and the mesh profiles of the MPs should be matched with each other. When the MPs set up the mesh peer link in accordance with the existing protocol, the MP having set up the mesh peer link cannot know whether the opposite MP should have the capability related to the HT service (for example, support the frame aggregation), and thus cannot utilize various HT PHY/MAC characteristics such as the frame aggregation.

And, the format of the A-MSDU in accordance with the IEEE 802.11n is not suitable as the format of the A-MSDU for aggregating plural MSDUs used in the wireless mesh network. The A-MSDU in accordance with the IEEE 802.11n standard is used to transmit data between two stations in an infrastructure basic service set (BSS) or an independent BSS (IBSS) and only data frames having the same source station and the destination station can be aggregated. However, since the wireless mesh network is designed to transmit data between wireless stations (for example, mesh points (MPs)) performing a relation function, the data transmitted through the mesh peer link may not have the same source station and/or the destination station. In addition, the format of the data frame used in the wireless mesh network is different from the format of the data frame for the infrastructure BSS or the IBSS.

Accordingly, an object of the invention is to provide a data transmission method in a wireless mesh network that can allow the use of a frame aggregation technique when it is intended to transmit plural data frames between two wireless stations having set up a mesh peer link.

Another object of the invention is to provide an A-MSDU format or configuration that can efficiently aggregate a data frame used in a wireless mesh network.

According to an aspect of the invention, there is provided a method of transmitting data in wireless mesh networks, the method comprising the steps of: establishing a mesh peer link with a mesh point (MP); generating an A-MSDU using a plurality of mesh data frames that are intended to be received by the MP; and transmitting the A-MSDU to the MP through the mesh peer link.

According to another aspect of the invention, there is provided a method of transmitting plural MSDUs in wireless mesh network, the method is characterized in that: the receiving MPs of all of the plural MSDUs to be transmitted are identical, and all of the plural MSDUs are transmitted in a format of A-MSDU which is generated by a transmitting MP using the plural MSDUs.

According to further another aspect of the invention, there is provided an A-MSDU format for aggregating plural MSDUs for wireless mesh network, the A-MSDU includes a plurality of A-MSDU sub-frames, wherein each of the A-MSDU sub-frames comprises a sub-frame header unit, an MSDU unit for containing data of each of the plural MSDU, and a padding unit for making each A-MSDU sub-frame a multiple of 4 octets in length, and wherein the sub-frame header unit comprises: a mesh DA field for specifying an MAC address of the destination MP of the data contained in the MSDU unit; a mesh SA field for specifying an MAC address of the source MP of the data contained in the MSDU unit; a mesh header field for containing information of the mesh header of each of the plural MSDUs; and a length field for specifying the length of the MSDU unit.

BRIEF DESCRIPTION OF THE DRAWINGS

The above and other features and advantages of the present invention will become more apparent by describing in detail exemplary embodiments thereof with reference to the attached drawings in which:

FIGS. 4 and 5 are diagrams illustrating a part of information included in a body portion of a peer link open frame that is used for the mesh peer link setup procedure according to the embodiment of the invention.

FIGS. 6 and 7 are diagrams illustrating a part of information included in a body portion of a peer link confirmation frame that is used for the mesh peer link setup procedure according to the embodiment of the invention.

DESCRIPTION OF THE EXEMPLARY EMBODIMENTS

Hereinafter, an embodiment of the invention will be described with reference to the accompanying drawings.

Figure 1:
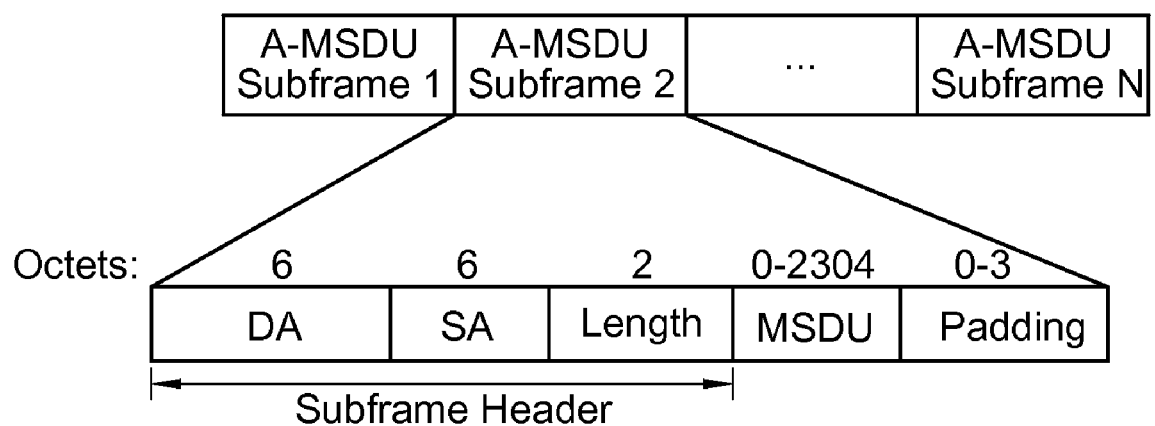
FIG. 1 is a diagram illustrating an A-MSDU format described in the IEEE 802.11n standard.
Figure 2:
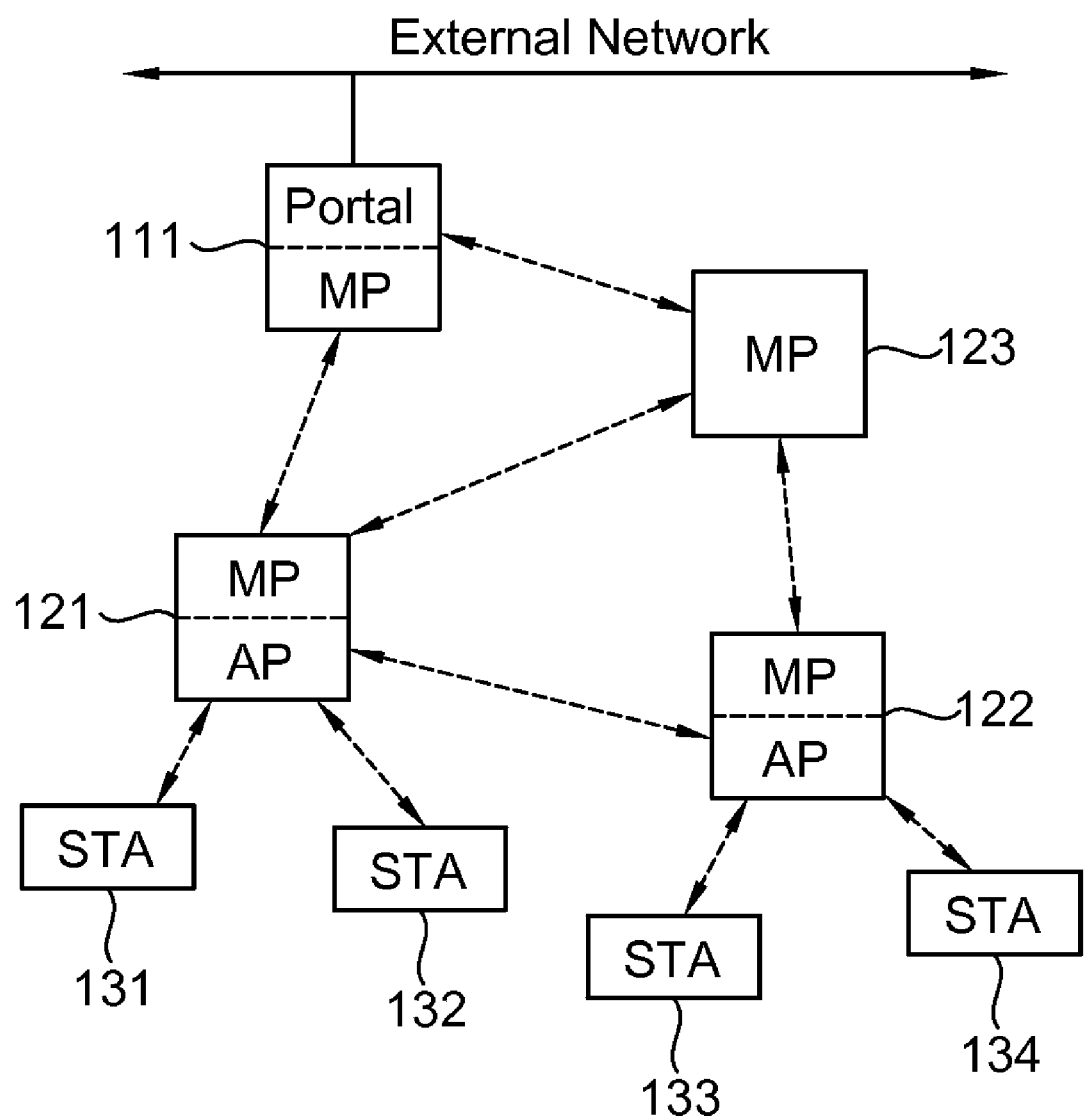
FIG. 2 is a diagram illustrating a configuration of a wireless mesh network.

FIG. 2 is a diagram illustrating a configuration of a wireless mesh network. A wireless mesh network has a unique mesh identifier, which is used as a title for identifying a group of MPs constituting the wireless mesh network. A method of giving the mesh identifier is not limited.

Referring to FIG. 2, the wireless mesh network includes one or more STAs 131, 132, 133, and 134 and one or more wireless stations, that is, MPs 110, 121, 122, and 123. Reference numerals 121 and 122 indicate MPs performing the function of an AP, that is, MAPs, since the STAs 131, 132, 133, and 134 associated therewith exist. Reference numeral 121 indicates an MP connected to an external network by wired or by wireless, which is called a mesh portal.

The STAs 131 to 134 are optional functional mediums including a medium access control interface and a physical layer interface for wireless mediums according to the IEEE 802.11 standard and are non-AP STAs. The STAs 131 to 134 notify their multi-cast subscription information to the MAP 121 or 122. The STAs may be called wireless transmitting/receiving unit (WTRU), user equipment (UE), mobile station (MS), or mobile subscriber unit, in addition to the title of wireless station.

The MPs 110, 121, 122, and 123 are entities constituting the wireless mesh network and are functional entities according to the IEEE 802.11 including the MAC and PHY interfaces according to the IEEE 802.11 standard. The MPs 110, 121, 122, and 123 are wireless devices supporting a mesh service. The mesh service includes all services permitting the direct communication between the MPs in the mesh network. The communication between the MPs for providing the mesh service, for example, the MP 121 and the MP 123, is made through a mesh link or a peer link as the direct link set up between two MPs. According to the embodiment of the invention, the MPs 110, 121, 122, and 123 support one or more HT MAC/PHY characteristics such as a frame aggregation function so as to accomplish a data processing rate of 100 Mbps or more.

In order to allow two or more MPs to set up peer links with each other to form a mesh network or to allow a different MP to participate in an existing mesh network, the mesh profiles of the MPs to set up the peer links should be necessarily equal to each other. The MPs support at least one mesh profiles. The mesh profile includes a mesh ID, a path selection protocol ID, and a path selection metric ID. The mesh profile may further include a congestion control mode ID.

As described above, an MP also having the function of an AP is particularly called an MAP. Accordingly, the MAPs 121 and 122 also perform the function of an AP for wireless stations associated therewith. The AP may be called convergence controller, base station (BS), node-B, or site controller, in addition to the title of access point.

When an MP discovers the neighboring MPs using a predetermined mesh discovery procedure, the MP tries to perform the mesh link setup procedure with the discovered neighboring MPs. The mesh link setup procedure is to set up logical links between the MPs and is a procedure for setting up peer links between the MPs, which is also called a peering procedure. In the mesh network, the MPs can transmit and receive data frames or management frames (except for management frames for the mesh discovery procedure or the peer link management procedure) after the mesh peer links are set up by the peering procedure. The MPs transmit and receive a peer link open frame and a peer link confirmation frame to set up the mesh peer links between the MPs.

Figure 3:
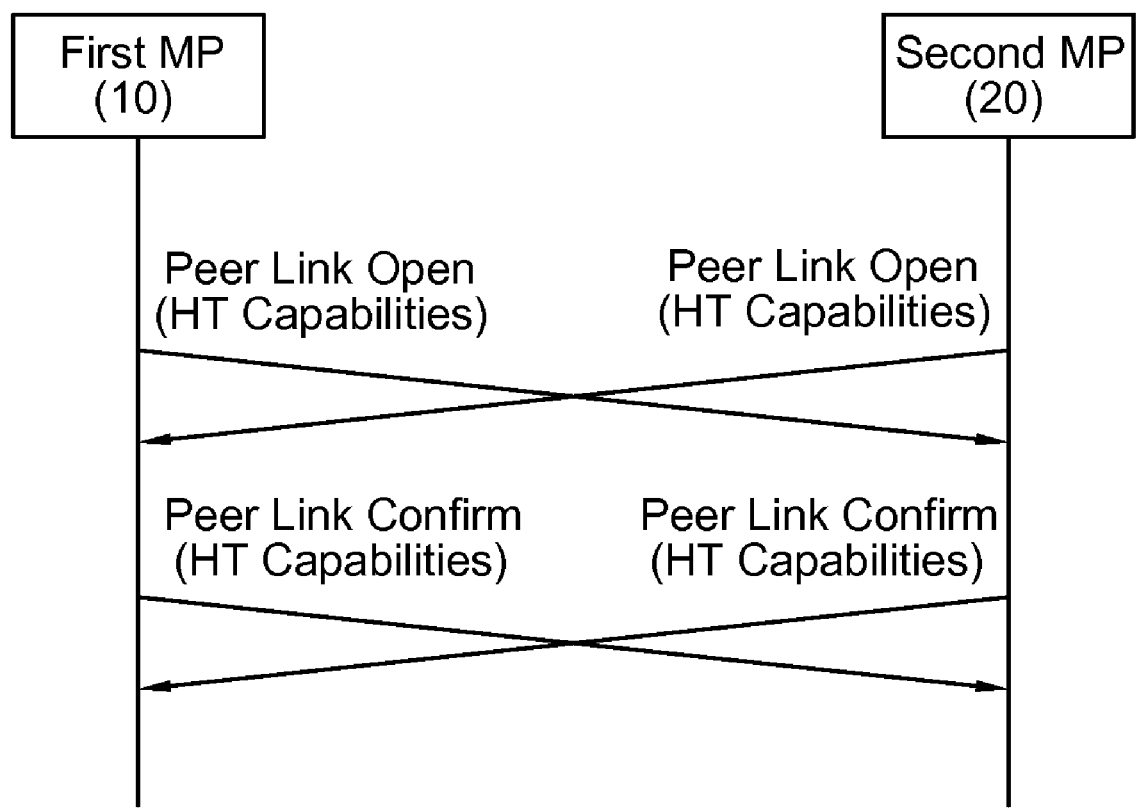
FIG. 3 is a diagram illustrating a flow of messages in a mesh link setup procedure for transmitting data according to an embodiment of the invention.

FIG. 3 is a diagram illustrating a flow of messages in the mesh link setup procedure for transmitting data according to the embodiment of the invention.

Referring to FIG. 3, a first MP 10 transmits a first peer link open frame to a second MP 20 and receives a first peer link confirmation frame from the second MP 20 in response to the first peer link open frame. The second MP 20 transmits a second peer link open frame to the first MP 10 and receives a second peer link confirmation frame from the first MP 10 in response to the second peer link open frame.

The sequence for transmitting and receiving the first peer link open and confirmation frames and the second peer link open and confirmation frames is not particularly limited. For example, the first MP 10 may transmit the first peer link open frame before or after receiving the second peer link open frame from the second MP 20, and may transmit the second peer link open frame before or after transmitting a second peer link response frame to the second MP 20 as a response to the second peer link open frame.

According to this embodiment, the first and second peer link open frames and the first and second peer link confirmation frames transmitted between the first MP 10 and the second MP 20 include capability information of a wireless station associated with the HT service, for example, HT capability information. That is, the peer link open and confirmation frames include one or more capability information supported by the MP among the HT capabilities associated with the HT service.

FIGS. 4 and 5 are diagrams illustrating examples of information included in a body portion of the peer link open frame used in the mesh peer link setup procedure according to the embodiment of the invention. As described above, the peer link open frame is used to start the mesh link setup procedure.

Referring to FIGS. 4 and 5, the body portion of the peer link open frame includes information on category, action value, capability, and supported rate. When a predetermined condition is satisfied, the body portion may further include information on extended support rate, power capability, supported channel, robust security network (RSN), QoS capability, mesh ID, mesh configuration, peer link management, mesh security capability information element (MSCIE), mesh security association handshake information element (MSAIE), and message integration code.

When the MP transmitting the peer link open frame is an MP supporting the HT PHY and MAC, that is, an HT MP, the body portion of the peer link open frame includes the HT capability information and may further include extended capability information and 20/40 BSS coexistence information. The body portion of the peer link open frame may further include HT information or HT operation information. The operation information includes information for controlling the operation of the HT MP in the mesh peer link.

The HT capability information is used to notify to the opposite MP that the HT MP supports the HT MAC and PHY (for example, that the HT MP supports the frame aggregation). In an aspect of this embodiment, the HT capability information should be necessarily included in the peer link open frame to use the HT service in the mesh network. That is, the HT MP transmits to the opposite MP the HT capability information indicating that it supports the HT MAC/PHY functions with the information included in the peer link open frame.

The extended capability information and the 20/40 BSS coexistence information is used to notify that the HT MP supports both the communication using a 20 MHz channel and the communication using a 40 MHz channel in the mesh network. In another aspect of the invention, the extended capability information may be optional information that can be included in the peer link open frame only when the HT MP has a BSS coexistence management support attribute for supporting both the communication using the 20 MHz channel and the 40 MHz channel. In this case, the peer link open frame may include the 20/40 coexistence information.

FIGS. 6 and 7 are diagrams illustrating examples of information included in a body portion of the peer link confirmation frame used in the mesh peer link setup procedure according to the embodiment of the invention. The peer link confirmation frame is a frame to be transmitted in response to the received peer link open frame and is used to confirm the reception of the mesh link open request.

Referring to FIGS. 6 and 7, the body portion of the peer link confirmation frame includes information on category, action value, capability, status code, association ID (AID), and supported rate. When a predetermined condition is satisfied, the body portion may further include information on extended support rate, robust security network (RSN), enhanced distributed channel access (EDCA) parameter set, mesh ID, mesh configuration, peer link management, mesh security capability information element (MSCIE), mesh security association handshake information element (MSAIE), and message integration code.

When the MP transmitting the peer link confirmation frame is an MP supporting the HT PHY and MAC, that is, an HT MP, the body portion of the peer link confirmation frame includes the HT capability information and the HT information or HT operation information and may further include the extended capability information, the 20/40 BSS coexistence information, and overlapping BSS scan parameter information.

The HT capability information and the HT information are used to notify to the opposite MP that the HT MP supports the HT MAC and PHY (for example, including the fact that the HT MP supports the frame aggregation) and to notify the HT-related information to the opposite. In an aspect of this embodiment, the HT capability information and the HT information should be necessarily included in the peer link open frame to use the HT service in the mesh network. That is, the HT MP transmits to the opposite MP the HT capability information indicating that it supports the HT MAC/PHY functions and the HT information including its relevant information with the information included in the peer link confirmation frame.

The extended capability information and the 20/40 BSS coexistence information is used to notify that the HT MP supports both the communication using a 20 MHz channel and the communication using a 40 MHz channel in the mesh network. The overlapping BSS scan parameter information is included only when the HT MP has the 40 MHz option executing attribute. In another aspect of the invention, the extended capability information may be optional information that can be included in the peer link confirmation frame only when the HT MP has a BSS coexistence management support attribute for supporting both the communication using the 20 MHz channel and the 40 MHz channel. In this case, the peer link confirmation frame may include the 20/40 coexistence information and the overlapping BSS scan parameter information.

In the HT service, the 20 MHz channel and the 40 MHz channel can be selectively used. When the 40 MHz channel is selected for use, there may be a problem that the communication with the legacy MP supporting only the 20 MHz channel or the HT MP selectively using the 20 MHz channel is not smoothly made. Accordingly, in this embodiment, by allowing the peer link opening frame to include the extended capability information and the 20/40 BSS coexistence information and allowing the peer link confirmation frame transmitted in response to the peer link open frame to include the extended capability information, the 20/30 BSS coexistence information, and the overlapping BSS scan parameter information, the HT service selectively using the 20 MHz and the 40 MHz channels is made to be usable in the mesh network.

That is, in this embodiment, the body portion of the peer link open frame is made to include the HT capability information and the HT operation information, and/or the extended capability information and the 20/40 BSS coexistence information as options, and the body portion of the peer link confirmation frame is made to include the HT capability information and the HT operation information and/or the extended capability information, the 20/40 BSS coexistence information and the overlapping BSS scan parameter information.

In the above-mentioned embodiment of the invention, the HT MPs can utilize the HT service through the mesh peer links. For example, the HT MPs having set up the wireless mesh link can utilize the frame aggregation. In the past mesh link setup procedure, even when the parties setting up the mesh links are all the HT MPs, one party cannot acquire the information indicating whether the opposite party is an MP supporting the HT service and thus cannot utilize the HT service. However, according to the above-mentioned embodiment of the invention, by allowing the MPs to transmit and receive the HT-related information in the mesh link setup procedure, the MPs having set up the mesh peer links can utilize the HT service (such as the frame aggregation).

The frame aggregation technique for the wireless mesh network according to the embodiment of the invention will be described now. The frame aggregation technique according to the embodiment of the invention to be described later relates to aggregating plural data frames (hereinafter, referred to as "mesh data frames") for the wireless mesh network.

Since the wireless mesh network supports proxy MPs, the mesh data frames require six address information pieces in maximum. Since the wireless mesh network supports the multi-hop transmission, the mesh data frames require time-to-live (TTL) information and/or mesh sequence number information.

Accordingly, the frame aggregation technique of the IEEE 802.11n cannot be applied for the mesh data frames without any change and thus it is necessary to define a new A-MSDU format for aggregating plural mesh data frames. The new A-MSDU format will be described now specifically.

Figure 8:
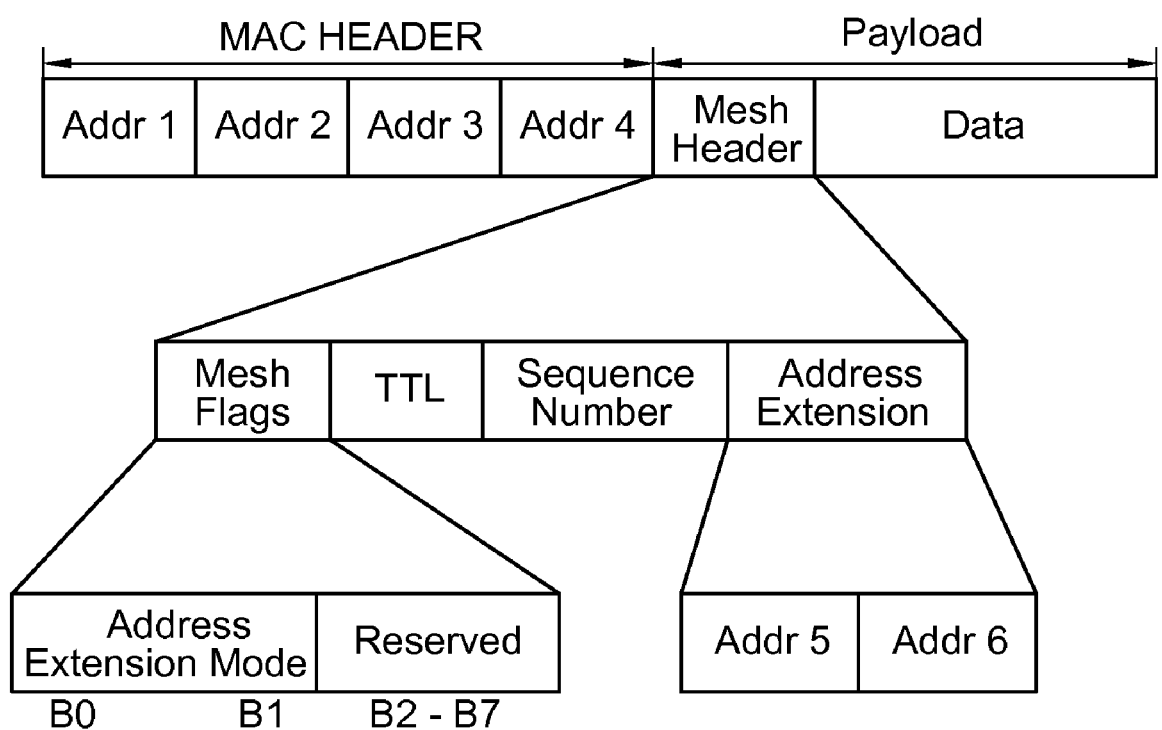
FIG. 8 is a diagram illustrating a format of a mesh data frame.

FIG. 8 is a diagram illustrating a format of a mesh data frame. Referring to FIG. 8, the mesh data frame includes a MAC header unit and a mesh header unit and a data unit in the payload subsequent to the MAC header unit. Similarly to general data frames, the MAC header unit includes four address fields (Addr1, Addr2, Addr3, and Addr4). The mesh header unit includes a mesh flag field, a mesh TTL field, a sequence number field, and an address extension field.

The mesh flag field includes flags used in control for a header process specific to the mesh network. The header process specific to the mesh network may be, for example, a mesh address extension process. Accordingly, the mesh flag field may include an address extension mode subfield, as shown in FIG. 8. The address extension mode subfield is used to indicate information included in the address extension field. The mesh TTL field is used to indicate the number of remaining hops to which the frame can be forwarded. The sequence number field is used to determine whether the same message is overlapped in the mesh network. The address extension field includes two address subfields (Addr5 and Addr6).

In this way, in the wireless mesh network, the format of the mesh data frame further includes two address subfields, compared with the format of the data frame used in the known wireless network and includes six address subfields in total (6-address format). The mesh flag field, the mesh TTL field, and the sequence number field of the mesh header are further included, compared with the format of the data frame in the known wireless network. Accordingly, in order to aggregate plural mesh data frames, it is necessary to define a new format of the A_MSDU suitable for the format of the mesh data frame.

Figure 9:
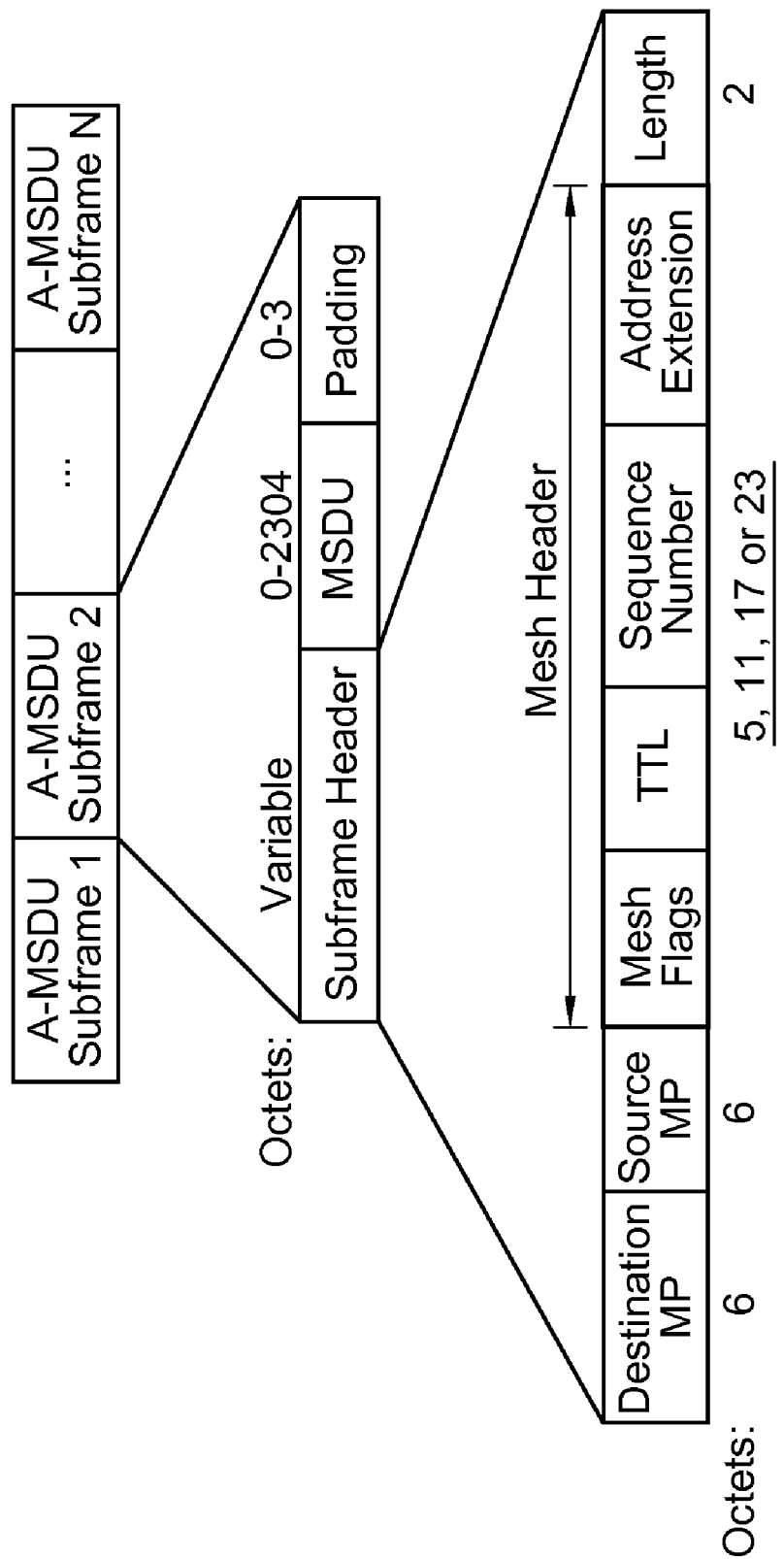
FIG. 9 is a diagram illustrating an A-MSDU format for aggregating plural mesh data frames according to an embodiment of the invention.

FIG. 9 is a diagram illustrating an A-MSDU format for aggregating plural mesh data frames according to an embodiment of the invention.

Referring to FIG. 9, the A-MSDU includes plural A-MSDU sub-frames. That is, the basic unit of the A-MSDU is an A-MSDU sub-frame and each A-MSDU sub-frame includes one MSDU. The MSDUs included in the same A-MSDU should have the same RA, that is, the same receiving station, and the same DA, that is, the same destination station. Each A-MSDU sub-frame includes a sub-frame header field, an MSDU field, and a padding field. The padding field exists in all the MSDU fields except for the final sub-frame. The padding field serves to allow the length of the sub-frame to be a multiple of 4 octets.

Each sub-frame header field includes a destination MP subfield, a source MP subfield, a mesh header subfield, and a length subfield. The destination MP subfield is set to a MAC address of an MP which is the final destination of the A-MSDU sub-frame among the plural MPs in the mesh network and is also called a mesh DA. The source MP subfield is set to a MAC address of an MP which has first transmitted the A-MSDU sub-frame among the plural MPs in the mesh network and is also called a mesh SA.

The mesh header field includes a mesh flag subfield, a mesh TTL subfield, a sequence number subfield, and an address extension subfield. The mesh flag subfield includes flags used to control the mesh-specific header processing such as the mesh address extension. The mesh-specific header processing may be a mesh address extension process. The mesh TTL subfield is used to indicate the number of remaining hops to which the frame can be forwarded. Accordingly, the mesh TTL subfield helps restrict the effect of transitory path selection loops in the multi-hop forwarding. The sequence number subfield is used to determine whether the same message is repeatedly received in the mesh network. The address extension subfield may further include two address subfields (Addr5 and Addr6) or may not any address subfield.

The mesh flag subfield, the mesh TTL subfield, the sequence number subfield, and the address extension subfield may vary depending on the mesh data (mesh MSDU). That is, the information included in the subfields is not necessarily equal to each other even when the transmitting station and the receiving station are equal. Accordingly, when the A-MSDU is constructed using the plural mesh data frames, the mesh header information included in the mesh data frames cannot be merged into the MAC header of the A-MSDU and are included in the A-MSDU sub-frames, respectively.

Finally, the length subfield of the sub-frame header field can be set to the length of the MSDU subsequent to the sub-frame header in the unit of octet.

According to the embodiment of the invention, when the transmitting MP and the receiving MP construct an A-MSDU by the use of the same plural mesh data (MSDU), the transmitting MP can aggregate the mesh data having the same receiving MP and include the aggregated mesh data in one MPDU or plural MPDU in the wireless mesh network, thereby improving the data processing speed. The receiving MP can confirm the destination MP and the source MP by A-MSDU sub-frames included in the A-MSDU and can relay the data (MSDU) included in the respective A-MSDU sub-frames to different MPs.

According to the above-mentioned embodiments of the invention, it is possible to process data at a high speed in accordance with the IEEE 802.11n through the established mesh peer link by allowing two MPs having setting up the mesh peer link to exchange HT capability information and/or HT operation information. Particularly, according to the aspects of the invention, the MPs having set up the mesh peer link can transmit plural data frames at once using the frame aggregation technique, thereby accomplishing a high data throughput. In addition, with the A-MSDU format according to the aspects of the invention, it is possible to transmit data using the frame aggregation technique, even when the source MP is different from the destination MP but the transmitting MP is equal to the receiving MP.

The embodiments described above in detail are only examples explaining the technical spirit of the invention and it should be understood that the technical spirit is not limited to the embodiments. The scope of the invention is defined by the appended claims.

What is claimed is:

1. A method of transmitting data in a wireless mesh network, the method comprising:
   establishing a mesh peer link with a mesh point (MP);
   generating an aggregate-medium access control service data unit (A-MSDU) including a plurality of A-MSDU sub-frames; and
   transmitting the A-MSDU to the MP through the mesh peer link,
   wherein each of the plurality of A-MSDU sub-frames comprises a sub-frame header unit, an MSDU unit containing mesh data, and a padding unit for making each of the plurality of A-MSDU sub-frames a multiple of 4 octets in length,
   wherein the sub-frame header unit comprises a mesh destination address (DA) field containing a medium access control (MAC) address of a destination MP of the mesh data contained in the MSDU unit, a mesh source address (SA) field containing a MAC address of a source MP of the mesh data contained in the MSDU unit, and a mesh header field,
   wherein the mesh header field comprises a mesh flags subfield, a mesh time-to-live (TTL) subfield, a sequence number field and an address extension subfield, the mesh flags subfield including an address extension mode subfield indicating contents of the address extension subfield, the mesh TTL subfield indicating a remaining number of hops that the corresponding A-MSDU subframe is forwarded, the sequence number field being used for filtering duplicate reception of the corresponding A-MSDU sub-frame, and the address extension subfield is for a mesh address extension of the corresponding A-MSDU sub-frame, and wherein the mesh DA field, the mesh SA field, the mesh flags subfield, the mesh TTL subfield, the sequence number field and the address extension subfield are configured sequentially in the subframe header unit.

2. The method according to claim 1, wherein establishing the mesh peer link comprises:
   transmitting a first peer link open frame regarding the mesh peer link to the MP, the first peer link open frame including high throughput capabilities information;
   receiving a first peer link confirm frame regarding the mesh peer link from the MP in response to the first peer link open frame; and
   transmitting a second peer link confirm frame regarding the mesh peer link to the MP in response to a second peer link open frame received from the MP, the second peer link confirm frame including high throughput capabilities information.

3. The method according to claim 2, wherein each of the first peer link open frame and the second peer link confirm frame further include high throughput operation information.

4. The method according to claim 3, wherein each of the first peer link open frame and the second peer link confirm frame further include extended capabilities information and 20/40 Basic Service Set (BSS) coexistence information.

5. The method according to claim 4, wherein:
   the extended capabilities information is included in the first peer link open frame when the 20/40 BSS coexistence information is included in the first peer link open frame; and
   the extended capabilities information is included in the second peer link confirm frame when the 20/40 BSS coexistence information is included in the second peer link confirm frame.

6. The method according to claim 2, wherein each of the second peer link open frame and the first peer link confirm frame include high throughput capabilities information and high throughput operation information.

7. The method according to claim 6, wherein each of the second peer link open frame and the first peer link confirm frame further include extended capabilities information and 20/40 Basic Service Set (BSS) coexistence information.

8. The method according to claim 2, further comprising performing a passive scanning procedure or an active scanning procedure to discover the MP before transmitting the first peer link open frame.

* * * * *